(12) United States Patent
Eilers et al.

(10) Patent No.: US 7,959,423 B2
(45) Date of Patent: Jun. 14, 2011

(54) VACUUM PUMP WITH A LUBRICANT PUMP

(75) Inventors: Martin Eilers, Asslar (DE); Michael Willig, Lahnau (DE)

(73) Assignee: Pfeiffer Vacuum GmbH, Asslar (DE)

( * ) Notice: Subject to any disclaimer, the term of this patent is extended or adjusted under 35 U.S.C. 154(b) by 427 days.

(21) Appl. No.: 12/291,776

(22) Filed: Nov. 12, 2008

(65) Prior Publication Data

US 2009/0123317 A1    May 14, 2009

(30) Foreign Application Priority Data

Nov. 13, 2007    (DE) .......................... 10 2007 053 979

(51) Int. Cl.
*F01C 21/04*    (2006.01)
*F04C 29/02*    (2006.01)

(52) U.S. Cl. ............. 418/88; 418/94; 418/98; 184/6.16; 184/6.28

(58) Field of Classification Search .................... 418/88, 418/94, 98; 184/6.16, 6.28
See application file for complete search history.

(56) References Cited

U.S. PATENT DOCUMENTS

| 1,913,844 | A | * | 6/1933 | McCormack | .................. 418/88 |
| 2,246,275 | A | * | 6/1941 | Davidson | ........................ 418/88 |
| 2,545,600 | A | * | 3/1951 | Berry | ............................... 418/94 |
| 2,940,661 | A | * | 6/1960 | Lorenz | ............................ 418/88 |
| 3,168,977 | A | | 2/1965 | Garnier | |
| 3,386,648 | A | * | 6/1968 | Van Rossem | ................ 418/108 |
| 3,753,623 | A | | 8/1973 | Wutz | |
| 5,256,042 | A | * | 10/1993 | McCullough et al. | .......... 418/88 |
| 5,263,822 | A | * | 11/1993 | Fujio | .............................. 418/88 |
| 5,314,318 | A | * | 5/1994 | Hata et al. | ....................... 418/88 |
| 5,779,005 | A | | 7/1998 | Jones | |
| 6,863,493 | B2 | | 3/2005 | Stones | |
| 7,367,429 | B2 | | 5/2008 | Blecker | |

FOREIGN PATENT DOCUMENTS

| DE | 482 826 | 9/1929 |
| DE | 23 09 665 | 2/1973 |
| DE | 195 10 015 | 9/1996 |
| DE | 20 2006 019 334 | 4/2007 |

* cited by examiner

*Primary Examiner* — Mary A Davis
(74) *Attorney, Agent, or Firm* — Abelman, Frayne & Schwab

(57) ABSTRACT

A vacuum pump includes a quick-rotatable component a bearing for supporting the quick-rotatable component and a lubricant pump for feeding lubricant to the bearing and having a rotor, with the bearing and the lubricant pump forming parts of a closed lubrication circuit having a hollow axle on which the rotor of the lubricant pump is rotatably supported.

7 Claims, 2 Drawing Sheets

VACUUM PUMP WITH A LUBRICANT PUMP

BACKGROUND OF THE INVENTION

1. Field of the Invention

The present invention relates to a vacuum pump having a bearing for supporting a quick-rotatable shaft, a lubricant pump having a rotor with at least one structure for producing a pumping-action, and a closed lubricant circuit in which the bearing and the lubricant pump are arranged.

2. Description of the Prior Art

Vacuum pumps with quick-rotatable components find today numerous industrial applications. In vacuum pumps designed for operation in the molecular flow region and for producing high-vacuum, the rapid rotational speed of these components lies in a range of tens of thousands revolutions per minute. In the state-of-the-art, two types of bearings are used for supporting these quick-rotatable components. To one type relate magnetic bearings which can be formed as passive or active magnetic bearing. To the other type relate precision roller bearings. A precision roller bearing requires lubrication to keep the wear as small as possible. In this case, often, close-circuit lubrication is used, and the vacuum pump includes a lubrication circuit in which there are arranged the roller bearing and a lubricant pump.

U.S. Pat. No. 7,367,429 discloses a lubricant circuit for a vacuum pump with a closed-circuit lubrication. The lubricant (oil) pump has two, oppositely extending, delivery spindles of which only one is immersed in the lubricant at a time. With such oil pumps, the oil pump bearing should be reliably supplied with lubricant. A poor supply can, however, endanger the reliability of the pump. In addition, a compact arrangement is desirable.

An object of the present invention is to provide a lubricant pump having a simple construction and a high reliability.

SUMMARY OF THE INVENTION

This and other objects of the present invention, which will become apparent hereinafter, are achieved by providing a vacuum pump including a quick-rotatable component, a bearing for supporting the quick-rotatable component, and a lubricant pump for feeding lubricant to the bearing and having at least one pumping action-producing structure including a rotor, with the bearing and the lubricant pump forming parts of a closed lubrication circuit including a hollow axle on which the rotor of the lubricant pump is rotatably supported.

The arrangement of a hollow axle in the lubrication circuit on which the rotor of the lubricant pump is supported, enables a reliable supply of the lubricant pump support with lubricant. This increases the service life of the lubricant pump and, thereby, of the vacuum pump. The compact structure enables integration into each other of the lubricant pump and a part of the lubrication circuit.

According to a first embodiment of the invention, the rotor and the hollow axle form parts of the radial bearing. This permits to avoid use of ball bearings in the lubricant pump, which increases the service life of the lubricant pump.

According to a further embodiment, a lubricant chamber at least partially surrounds the rotor. Thereby, the lubricant reservoir and the lubricant pump form a unit, which saves space and reduces the number of components.

According to a still further embodiment, a helical channel is used as a delivery structure, with the helical channel being arranged on a pumping element of the rotor the diameter of which is greater than the diameter of the shaft section of the rotor.

For a constant flow of the lubricant to the inlet of the helical channel, it is advantageous when a structure that delivers lubricant under action of a centrifugal source, is located between the shaft section and the helical channel. A constant feeding flow is achieved when an angle that differs from zero, is formed between the direction of the gravity force and the rotor axis. In this case, metal chips, the specific weight of which is greater than that of the lubricant, would be accelerated outwardly by the centrifugal force and would not enter the helical channel.

Advantageously, the delivery structure includes a cone, a small diameter of which corresponds to the diameter of the shaft section and a large diameter of which corresponds to the diameter of the another section. This provides for a simple and cost-effective manufacturing of the vacuum pump.

According to a further advantageous embodiment of the invention, the lubricant pump includes an axial slide bearing provided at an end of the rotor remote from the helical channel and lubricated by the feedable lubricant. Thereby, the axial forces, which are generated by the feedable lubricant, are used for pressing the rotor into the slide bearing, which insures a stable operation.

According to a further advantageous embodiment of the present invention, a sieve is located in the lubricant chamber and at least partially surrounds the rotor. The sieve prevents soiling of the delivery structure in the lubricant pump and entry of particles into the vacuum pump. With the sieve being located in the lubricant chamber, a need to provide a sieve in another location in lubrication circuit is eliminated. Thus, the location of the sieve in the lubricant chamber permits to dispense with additional parts, and a possibility of errors is avoided.

According to a still further advantageous embodiment of the present invention the lubricant pump is located in a housing releasably connectable with the vacuum pump housing. This facilitates replacement of a lubricant pump, on one hand, and, on the other hand, permits to contemplate several mounting angles. This permits to retrofit a vacuum pump for different positions.

According to a yet another advantageous embodiment, the lubricant pump housing has a transparent section for a visual inspection of the lubricant condition and an easy control of the lubricant pump functioning.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
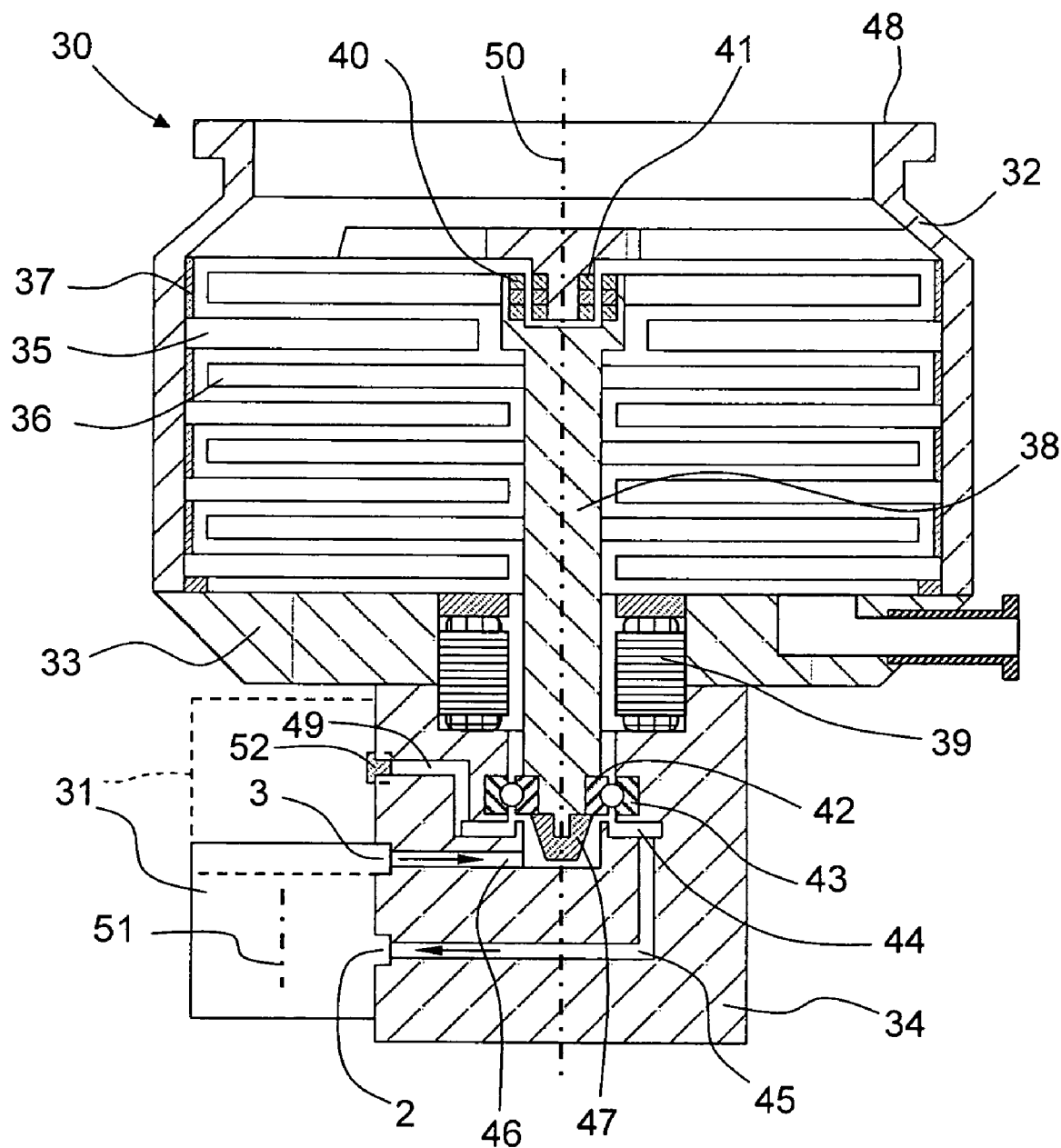
FIG. 1 a cross-sectional view of a vacuum pump according to the present invention, together with a lubricant pump.

A vacuum pump 30 according to the present invention, which is shown in FIG. 1 together with a lubricant pump 31, has a multi-part housing. Pump-active components of the vacuum pump 30 are located in a first, high vacuum-side housing part 32. The housing part 32 is connectable by a flange 48 and by connection elements (not shown) with a recipient. The pump-active components include stator discs 35 and rotor discs 36 which carry vanes and are arranged in several planes. The stator discs 35 are axially spaced from each other by spacer rings. Instead of vanes, other pump-active structures can be used, e.g., the structures according to Holweck and Siegbahn. The rotor discs 36 are mounted on a rotor shaft 38 at an axial distance from each other. The stator discs 35 extend into spaces defined by the axial distances between the rotor discs 36. A drive 39 rapidly rotates the rotor shaft 38. In order to achieve a desired pumping effect, the rapid rotational speed lies in a range of tens of thousands of revolutions per minute. At those rotational speeds, the pump-active components produce high vacuum, i.e., a molecular flow region is reached. The drive is located in a second, vorvacuum-side housing part 33.

The rotor shaft 38 is rotatably supported by two bearings provided, respectively, at opposite ends of the rotor shaft 38. At the high vacuum-side end of the rotor shaft 38, a rotor-side permanent magnet ring 40 and a stator-side permanent magnet ring 41 form a wear-free permanent magnet bearing that does not require any lubrication. At the opposite end of the rotor shaft 38, there is provided a roller bearing the inner ring 42 of which is secured on the rotor shaft 38 with a spray nut 47. The outer ring 43 of the roller bearing is held in a third housing part 34. This housing part 34 can include elastic components not shown in the drawings but known in the state of the art. The elastic components oscillatingly retain the outer ring 43.

The number of housing parts is not binding. E.g., the second part 33 and the third part 34 can be combined. Other distributions, which would provide or the above-mentioned functions, are also possible.

A roller bearing has components which roll over each other and, therefore, require lubrication. In order to insure lubrication, the vacuum pump is provided with a lubricant circuit. The lubricant circuit includes a feeding channel 46 through which the lubricant is fed in the direction of the roller bearing through the third housing part 34. The lubricant reaches the spray nut 47 that has a conical shape. Thereby, at a rapid speed, a centrifugal feeding, which provides for feeding of lubricant in the roller bearing, takes place. From the roller bearing the lubricant reaches, e.g., under a gravity force, a collection chamber 44. Instead of the gravity force, other suitable delivery means can be used, such as, e.g., porous bodies that provide lubrication by using capillary effect. From the collection chamber 44, the lubricant flows through a return channel 45 to an inlet 2. In FIG. 1, the inlet 2 is shown only as a functional group of the lubricant pump 31. At the inlet 2, lubricant is under pressure and is available at the outlet 3. The outlet 3 is in fluid communication with the feeding channel 47, so that the lubricant circuit is closed. The lubricant circuit can have other components, e.g., flow sensors.

In FIG. 1, the lubricant pump 31 is shown as a unit flanged on the third housing part 34. However, portions of the lubricant pump or the entire pump can also be integrated in the vacuum pump.

The axis 50 of the rotor shaft 38 extends parallel to the axis 51 of the lubricant pump 31. Thereby, an advantageous rotatability of the entire vacuum pump over a wide rotational range is achieved. In particular, an orientation parallel and transverse to the gravity force direction is possible.

A second return channel 49 permits to connect the lubricant pump with the vacuum pump when the lubricant pump is pivoted by 180° with respect to the orientation described above, and operates the vacuum pump when it is likewise pivoted by 180°. At this orientation, which is shown in FIG. 1 with dash lines, the second return conduit 49 is connected with the inset 2 of the lubricant pump 31. The second return channel 49 enables to use the vacuum pump, upon rotation of the lubricant pump, in all orientations with respect to the direction of the gravity force. The respective non-used return channel is closed with a plug 52. According to further development of the present invention, the first and second return channels are so formed that inside the vacuum pump, they run jointly, and a common outlet of the return channels is connected with the inlet of the lubricant pump. This permits to prevent assembly errors.

Figure 2:
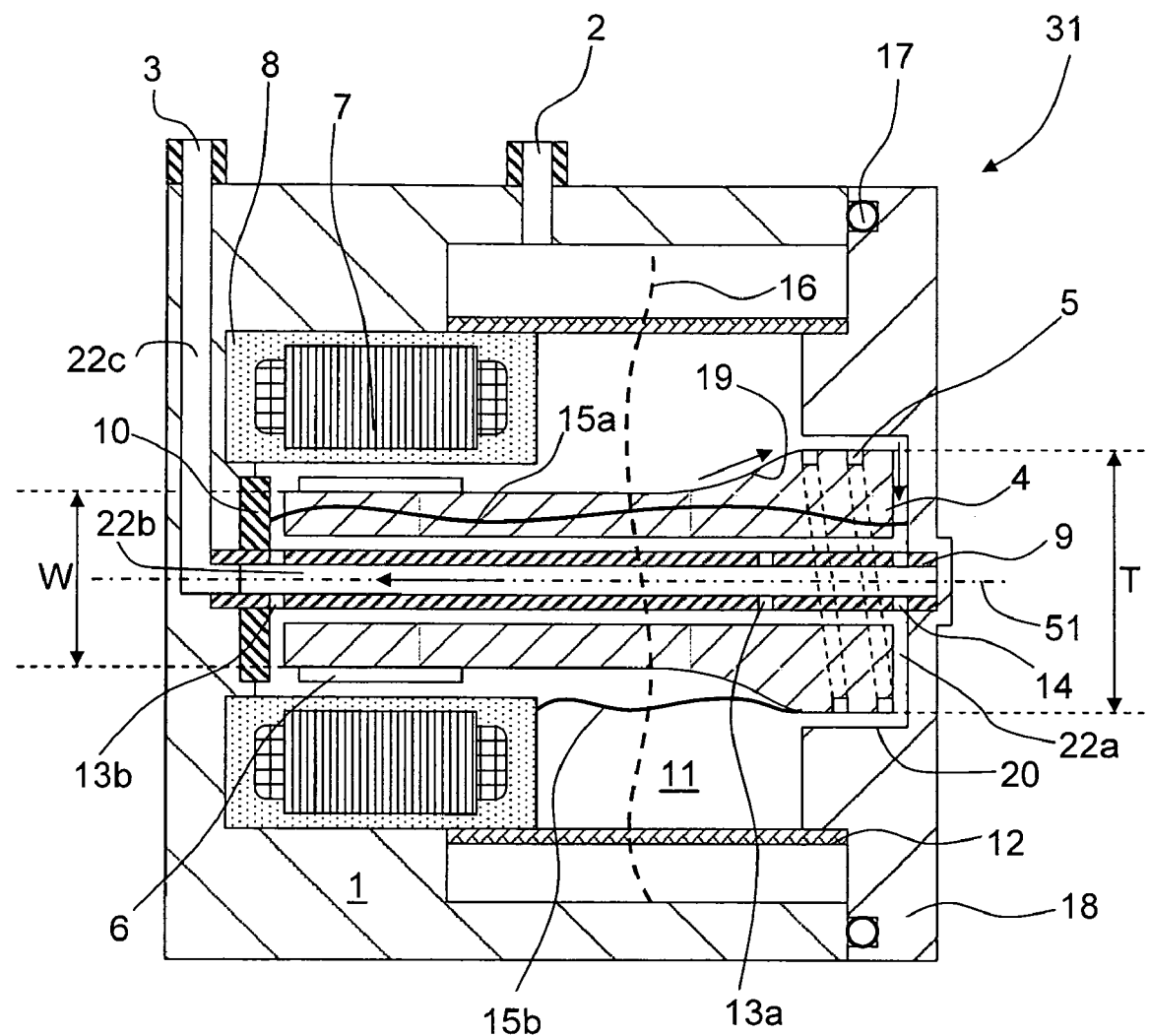
FIG. 2 a cross-sectional view of the lubricant pump.

The functioning principle of the lubricant pump 31 will be explained in detail with reference to FIG. 2. The lubricant pump 31 has a housing 1 with the inlet 2 and the outlet 3. The inlet 2 is in fluid communication with a lubricant chamber 11. Inside the housing 1, there is provided a hollow axle 9 that extends through the lubricant chamber 11. The hollow axle 9 is surrounded by the rotor 4 at least in some regions. The rotor 4 is also located in the lubricant chamber 11. On a shaft section of the rotor 4, there are provided permanent magnets 6 which form, together with electric coils 7, the drive that sets the rotor 4 in rotation. For an electrical insulation, the electrical coils 7 are embedded in a compound 8. A sieve 12 is so arranged in the lubricant chamber 11 that it completely surrounds the rotor 4 and separates its surface from the inlet 2. Therefore, only a filtered lubricant can reach the rotor surface through the sieve and, thereby, penetrates in the feeding line. This measure prevents feeding back of particles that were collected by the lubricant inside the vacuum pump. Such particles are formed, e.g., as a result of abrasion in the roller bearing.

The housing 1 has a transparent section 18. This section provides for a visual examination of the lubricant chamber 11 and the lubricant filling the same. A seal 17, which is provided between the transparent section 18 and the rest of the housing 1, prevents leakage of the lubricant.

The rotor 4 is rotatably supported by slide bearings. The hollow axle 9, which extends therethrough, forms a radial bearing and insures concentric running of the rotor 4. At one end of the rotor 4, an axial bearing 10 is arranged. This end is located opposite the end in the direction of which a helical channel 5 delivers the lubricant. The clearance of the slide bearing between the rotor 4 and the hollow axle 9, on one hand, and between the rotor 4 and the axial bearing 10, on the other hand, is increased for clarity sake. The delivery action of the helical channel 5 produces a force in the axial direction that acts on the rotor. This force is also applied to the axial bearing 10. In the hollow axle 9, lubricant, which is subjected to pressure at the switched-on lubrication, is located.

Delivery bores 13$a$ in the radial bearing and delivery bores 13$b$ in the axial bearing 10 provide for lubrication of the rotor 4, with the pressurized lubricant flowing therethrough from the hollow axle 9 and forming a lubricant film between the hollow axle 9 and the rotor 4 and/or between the rotor 4 and the axial bearing 10. Thus, the feeding of the lubricant simultaneously provides for lubrication of the slide bearings of the rotor of the lubricant pump. Further components are not necessary, and a very long service life is achieved. A further advantage of this embodiment consists in that the lubricant takes over the function of a seal. Elastomeric rings or other known sealing means are dispensed with because the lubricant films seal the gaps in the radial and axial bearings, whereby the regions of the lubricant pump with the pressurized lubricant are sealed against the remaining regions of the lubricant pump. The lubricant is under pressure in the axle feeding channel 22$a$, in the axle inner space 22$b$, and in the lubricant channel 22$c$. Because the rotor 4 and the hollow axle 9 form a unit, a further advantage consists in that the mounting of the hollow axle 9 in the housing 1 does not require a high precision.

The feeding action of the lubricant pump is based on the design of the rotor. The rotor 4 has, in the region of its shaft section, a first diameter W. In the region of the helical channel 5, the rotor has a second diameter T greater than the first diameter W. The widening of the diameter from the diameter W to the diameter T takes place in the region of a cone 19. The cone 19 provides for delivery of the lubricant by a centrifugal force in the direction of the greater diameter T. In the region with the greater diameter T, the helical channel 5 is provided. A rotor section with the helical channel 5 is located in a cylindrical recess 20. The clearance between the wall of the recess and the rotor surface is so selected that it enhances the delivery action. The delivery path is shown with arrows. The lubricant is delivered along the cone 19 in the region with helical channel 5. The channel 5 delivers the lubricant along the end surface of the rotor to the hollow axle 9. The pressurized lubricant is fed into the hollow axle 9 through inlet bores 14 and is delivered through the hollow axle 9 in the direction of the outlet 3 of the lubricant pump.

The advantage of this design consists in a possible orientation of the lubricant pump with respect to the direction of action of the gravity force. In FIG. 2, the course of the lubricant surface in the lubricant chamber 11 is given for two orientations of the lubricant pump.

A lubricant surface 16 is formed when the rotor axis 51 extends parallel to the direction of action of the gravity force. The cone 19 and the helical channel 5 are completely submerged in the lubricant. Upon rotation of the rotor 4, the helical channel 5 provides for feeding in the direction of action of the gravity force. Thereby the lubricant rises through the hollow axle 9 against the action of the gravity force.

The lubricant surface 15 is formed when the rotor axis 51 extends transverse to the direction of action of the gravity force. The lubricant surface 15 is above the hollow axle 9 with respect to the direction of action of the gravity force. In this case, the delivery action is based primarily on the cone 19 that supplies the helical channel 5 with the lubricant when this section of the rotor 4 extends from the lubricant. A continuous delivery through the cone 19 is only then possible when formation of air bubbles in the lubricant flow is prevented. Such bubbles greatly endanger feeding of lubricant to the vacuum pump bearing.

The filling level of the lubricant can drop maximum to the lowest level 15b at orientation of the rotor axis transverse to the direction of action of the gravitational force. At this lowest level, the rotor still contacts the lubricant surface and picks up the lubricant for delivery. This limits the amount of the lubricant circulating in the entire lubrication system. Thereby, the use time per amount of lubricant drops so that the service life of the lubricant pump and, thereby, of the vacuum pump increases.

Because the lubricant pump can be oriented both parallel and transverse to the direction of action of the gravitational force, large margins for maneuver are available at orientation of the vacuum pump. It is particular advantageous when the axes of the rotors of the lubricant pump and the vacuum pump, respectively extend parallel to each other. In this case, a particularly favorable clearance can be chosen. With the above-described realization of lubricant paths within the vacuum pump, a maximal usable life of a vacuum pump is achieved.

It is also possible to arrange the lubricant pump within the housing of the vacuum pump.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A vacuum pump, comprising a quick-rotatable component; a roller bearing for supporting the quick-rotatable component; and a lubricant pump for feeding lubricant to the roller bearing and having at least one pumping action-producing structure including a rotor, the roller bearing and the lubricant pump forming parts of a closed lubrication circuit including a hollow axle on which the rotor of the lubricant pump is rotatably supported, wherein the rotor of the lubricant pump has a shaft section and a helical channel provided in another section of the rotor, and wherein the section with the helical channel has a diameter greater than a diameter of the shaft section, wherein the rotor has a delivery structure located between the shaft section and the helical channel for delivery the lubricant in a region of the helical channel by centrifugal force, wherein the delivery structure includes a cone, a small diameter of which corresponds to the diameter of the shaft section and a large diameter of which corresponds to the diameter of the another section.

2. A vacuum pump according to claim 1, wherein the rotor and the hollow axle form parts of a radial slide bearing.

3. A vacuum pump according to claim 1, wherein the lubricant pump includes a lubricant chamber at least partially surrounding the rotor.

4. A vacuum pump according to claim 3, wherein the lubricant pump comprises a sieve located in the lubricant chamber and at least partially surrounding the rotor.

5. A vacuum pump according to claim 1, wherein the lubricant pump includes an axial slide bearing provided at an end of the rotor remote from the helical channel and lubricated by the lubricant fed to the roller bearing.

6. A vacuum pump according to claim 1, wherein the lubricant pump comprises a lubricant pump housing releasable connectable with a vacuum pump housing and in which the pumping action-producing structure is located.

7. A vacuum pump according to claim 6, wherein the lubricant pump housing has a transparent section for a visual inspection of the lubricant pump.

\* \* \* \* \*